United States Patent [19]

Bender

[11] Patent Number: 5,718,148

[45] Date of Patent: Feb. 17, 1998

[54] TRANSVERSELY INSTALLED MOTOR VEHICLE GEAR-CHANGE UNIT

[75] Inventor: Helmut Bender, Pleidelsheim, Germany

[73] Assignee: Mc Micro Compact Car AG, Switzerland

[21] Appl. No.: 571,055

[22] Filed: Dec. 12, 1995

[30] Foreign Application Priority Data

Dec. 12, 1994 [DE] Germany .............. 44 44 120.7

[51] Int. Cl.⁶ .................. F16N 3/08; B60K 17/08
[52] U.S. Cl. .................. 74/325; 74/330; 74/331; 475/198; 475/203
[58] Field of Search ............. 74/325, 330, 331; 475/198, 200, 201, 203

[56] References Cited

U.S. PATENT DOCUMENTS

| 4,945,874 | 8/1990 | Nishitani et al. ........... 123/400 |
| 5,078,111 | 1/1992 | McCann ........................ 123/400 |

FOREIGN PATENT DOCUMENTS

| 0 242 338 | 10/1987 | European Pat. Off. . |
| 0 281 693 | 9/1988 | European Pat. Off. . |
| 0 562 227 A1 | 9/1993 | European Pat. Off. . |
| 27 24 104 | 12/1977 | Germany . |
| 35 00 992 A1 | 7/1985 | Germany . |
| 40 36 953 C1 | 1/1992 | Germany . |
| 205 282 | 6/1939 | Switzerland . |
| 605729 | 5/1978 | U.S.S.R. ........................ 475/203 |
| 2 155 997 | 10/1985 | United Kingdom . |

OTHER PUBLICATIONS

Zahnradgetriebe, Johannes Looman, 1988, 4 pages.

*Primary Examiner*—Khoi Q. Ta
*Attorney, Agent, or Firm*—Evenson, McKeown, Edwards & Lenahan, P.L.L.C.

[57] ABSTRACT

A change-speed gear unit has an output shaft, connected to a parallel input shaft in two forward gear ratios by a forward-speed gear stage. The output shaft is connected to a differential gear unit in one forward gear ratio by an auxiliary gear stage, and in the other forward gear ratio by a gear stage used as a gear constant.

12 Claims, 4 Drawing Sheets

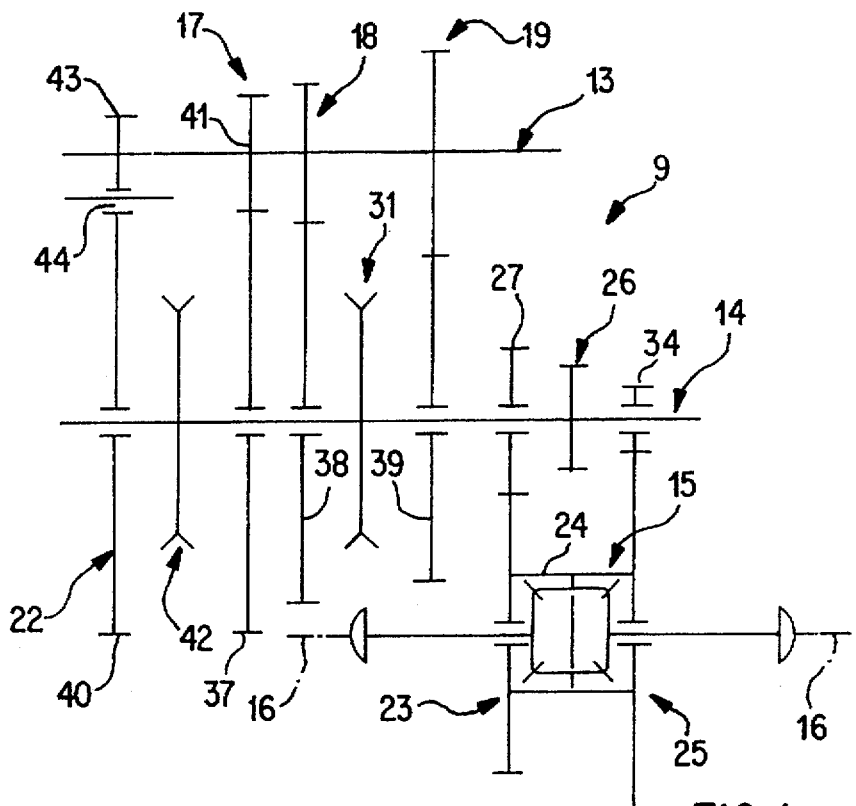

| | 42 | | 31 | | 26 | |
|---|---|---|---|---|---|---|
| | 40 | 37 | 28 | 29 | 35 | 36 |
| VI | | | X | | X | |
| V | | | | X | X | |
| IV | | X | | | X | |
| III | | | X | | | X |
| II | | | | X | | X |
| I | | X | | | | X |
| R | X | | | | | X |

TRANSVERSELY INSTALLED MOTOR VEHICLE GEAR-CHANGE UNIT

BACKGROUND AND SUMMARY OF THE INVENTION

The present invention relates to a change-speed gear unit, and more particularly, to a change-speed gear unit for a motor vehicle, comprising an input shaft and a parallel output shaft, a three-element planetary differential gear unit, a forward-speed gear stage connected to the input shaft, an auxiliary gear stage connected to the output shaft, a charge-speed clutch associated with the auxiliary gear stage, and a gear stage arranged in a power flow between the output shaft and a gear element, on an input side, of the differential gear unit.

EP 0 242 338 A1 describes a gear change unit in which the auxiliary gear stage with the high ratio, relative to the longitudinal directions of the output shaft, is arranged between the gear stage for forming the reverse gear and the auxiliary gear with the low ratio as well as the gear stage for forming the lowest forward gear is arranged between the gear stage for forming the reverse gear and the auxiliary gear stage with the high ratio. On the output shaft, a gear change clutch is arranged whose shift sleeve, which is non-rotatable with respect to the output shaft, is used for the faciltative coupling of the two loose wheels of the gear stage for forming the lowest and the highest forward gear to the output shaft. In addition, it carries the gear ring, which is concentric to the output shaft, of the gear stage for forming the reverse gear. The latter, by way of the axial sliding of an intermediate gear which meshes with a gear non-rotatably disposed on the input shaft, is engaged in the gear ring of the shift sleeve brought into the neutral position and is therefore not synchronized. For this gear change unit, it is important that the number of gear stages used as the driving connection between the input and the output shaft is smaller than the number of the achievable forward gears, thus smaller than 2×2=4. Although there is a discussion of the ability to increase the number of the achievable forward gears by an additional gear stage used as the driving connection between the input and the output shaft, the document does not teach how to implement such a gear change unit.

In the change-speed gear unit described in EP 0 562 227 A1, the auxiliary gear stage inserted into the torque transmission in the lowest forward gear ratio is formed by a double gear mounted on the input shaft as a loose wheel and by a loose wheel which meshes with the one toothed rim of the double gear and which is mounted on the output shaft and can be coupled to the output shaft by an associated change-speed clutch. The double gear of this known auxiliary gear stage can be driven by a gear, meshing with its other toothed rim, of an intermediate shaft, which is mounted as a hollow shaft on the output shaft and can be coupled to the output shaft by the associated change-speed clutch in order to disconnect the auxiliary gear stage from the torque transmission. The intermediate shaft is coupled in the first and second forward gear ratios to the loose wheel of a forward-speed gear stage driven by the input shaft, while in the first gear ratio the loose wheel of the auxiliary gear stage and in the second gear ratio the intermediate shaft are coupled to the output shaft by the associated change-speed clutch.

DE 27 24 104 A1 describes a change-speed gear unit which differs entirely from the known change-speed gear unit mentioned above in the following respect. This known change-speed gear unit consists of a transmission system for an agricultural working machine and is arranged in the power flow downstream of an engine arranged in the longitudinal direction of the vehicle. Its six parallel gear shafts likewise lie in the longitudinal direction of the vehicle and the output shaft is connected to an integrated power divider, in which the output shaft is connected, by a gear stage to form a cross-country gear ratio and by a gear stage to form a road gear ratio, to a parallel intermediate shaft which drives a differential gear unit which is of the planetary type and which lies with its central axis coaxial to the intermediate shaft and is arranged to act between the front and rear axles. While the one gear element, on the output side, of the differential gear unit is connected by a cardan shaft to the rear axle, the other gear element, on the output side, of the differential gear unit drives a pinion shaft which passes through the hollow intermediate shaft of the power divider and which by way of a bevel-wheel gear stage drives a spur-wheel gear stage which lies axially parallel to the front axle and which in turn is drivingly connected to the axle drive of the front axle.

Another type of axle drive is known for the rear axle of a utility vehicle, wherein a differential gear unit of the planetary type and a claw-shifted two-speed spur-wheel layshaft gear unit, arranged upstream of the differential gear unit in the power flow, are housed in a common axle drive casing. In this known arrangement, the spur-wheel layshaft gear unit according to DE 35 00 992 A1 may have two parallel gear shafts which lie at right angles to the central axis of the differential gear unit and of which the one can be driven with the aid of a cardan shaft by the change-speed gear unit, while the other meshes, by way of its bevel pinion, with the ring gear of the differential gear unit.

For the one gear shaft of the two-speed spur-wheel layshaft gear unit, it is possible as discussed in Looman, Johannes, Zahnradgetriebe, Grundlagen, Konstruktionen, Anwendungen in Fahrzeugen [Gear Units, Basic Principles, Designs, Applications in Vehicles], second completely revised and enlarged edition, Springer-Verlag Berlin, 1988, page 331, FIG. 9.35) to use the gear casing which is used as the gear element, on the input side, of the differential gear unit and to which the two associated gears of the spur-wheel layshaft gear unit are connected for movement therewith, while the other gear shaft, arranged parallel to the central axis of the differential gear unit, of the spur-wheel layshaft gear unit can be driven with the aid of a bevel gear stage by a pinion shaft which lies axially at right angles to the central axis and which can be connected to the change-speed gear unit by a cardan shaft.

An object of the present invention is to provide a change-speed gear unit for transverse installation in the motor vehicle and distinguished by high efficiency in the reduction of fuel consumption, by low production costs and by a low weight.

The foregoing object has been advantageously achieved according to the present invention by providing that the two gear elements, on an output side, of the differential gear unit are each used to drive one vehicle wheel of a driving axle and the central axis of the differential gear unit is arranged parallel to the input shaft and output shaft and coaxially to the driving axle. The forward-speed gear stage has two gears meshable with one another and of which one gear is arranged coaxially at the input shaft for rotation therewith and the other gear is arranged coaxially at the output shaft. Two forward gear ratios are formed with the cooperation of the change-speed clutch such that the forward-speed gear stage is connected in the lowest forward gear ratio to the differential gear unit via the auxiliary gear stage and in a higher forward gear ratio is connected thereto with the auxiliary gear stage disconnected from the torque transmission.

Furthermore, the auxiliary gear stage, which is insertable into the torque transmission in the lowest forward gear ratio, is also arranged in the power flow between the output shaft and the gear element, on the input side, of the differential gear unit and, in at least two successive forward gear ratios, is inserted into the torque transmission, serially in the power flow, together with a forward-speed gear stage, and the other gear stage arranged in the power flow between the output shaft and the gear element, on the input side, of the differential gear unit is uncoupleable by the change-speed clutch from the output shaft and is also insertable, as a second auxiliary gear stage, into the torque transmission only in at least two successive other gear ratios.

In the change-speed gear unit according to the present invention, neither a double gear nor an intermediate shaft is required for the auxiliary gear stage inserted into the torque transmission in the lowest forward gear ratio, so that construction needs, weight, fuel consumption and production costs are consequently reduced.

Active gear engagements are reduced in the change-speed gear unit according to the invention to further lower fuel consumption.

In the change-speed gear unit according to the present invention, a two-stage auxiliary gear unit is provided, wherein one gear stage is combined with the gear stages of the main gear unit in the lower gear ratios and the other gear stage is combined therewith in the higher gear ratios.

In the change-speed gear unit according to the present invention, the main gear unit can be designed with a relatively narrow spread of, for example, 1.7, with a total spread of 5.0. The differential speeds of rotation of the gear elements are thereby greatly reduced, whereby efficiency is improved at particularly relevant operating points, for example in the fifth gear ratio with a constant speed of travel of 90 or 120 kilometers per hour.

In the change-speed gear unit according to the invention, only loose wheels have to be arranged on the output shaft, so that for a group change, in which both the gear stage in the main gear unit and the gear stage in the auxiliary gear unit are changed, only the output shaft has to be accelerated or retarded. The change-speed clutch, arranged on the output shaft, of the auxiliary gear unit can thus be made in the form of a claw clutch, which is less expensive and permits shorter shift times than with frictional synchronization.

BRIEF DESCRIPTION OF THE DRAWINGS

These and other objects, features and advantages of the present invention will become more readily apparent from the following detailed description thereof when taken in conjunction with the accompanying drawings wherein:

FIG. 1 is a schematic gear diagram of a first embodiment of a change-speed gear unit according to the present invention;

FIG. 2 is a gear ratio table for the shift conditions of the change-speed gear unit of FIG. 1, when the gear unit is operated with five forward gear ratios;

FIG. 3 is a gear ratio table for the shift conditions of the change-speed gear unit of FIG. 1 when the gear unit is operated with six forward gear units;

DETAILED DESCRIPTION OF THE DRAWINGS

Figure 4:
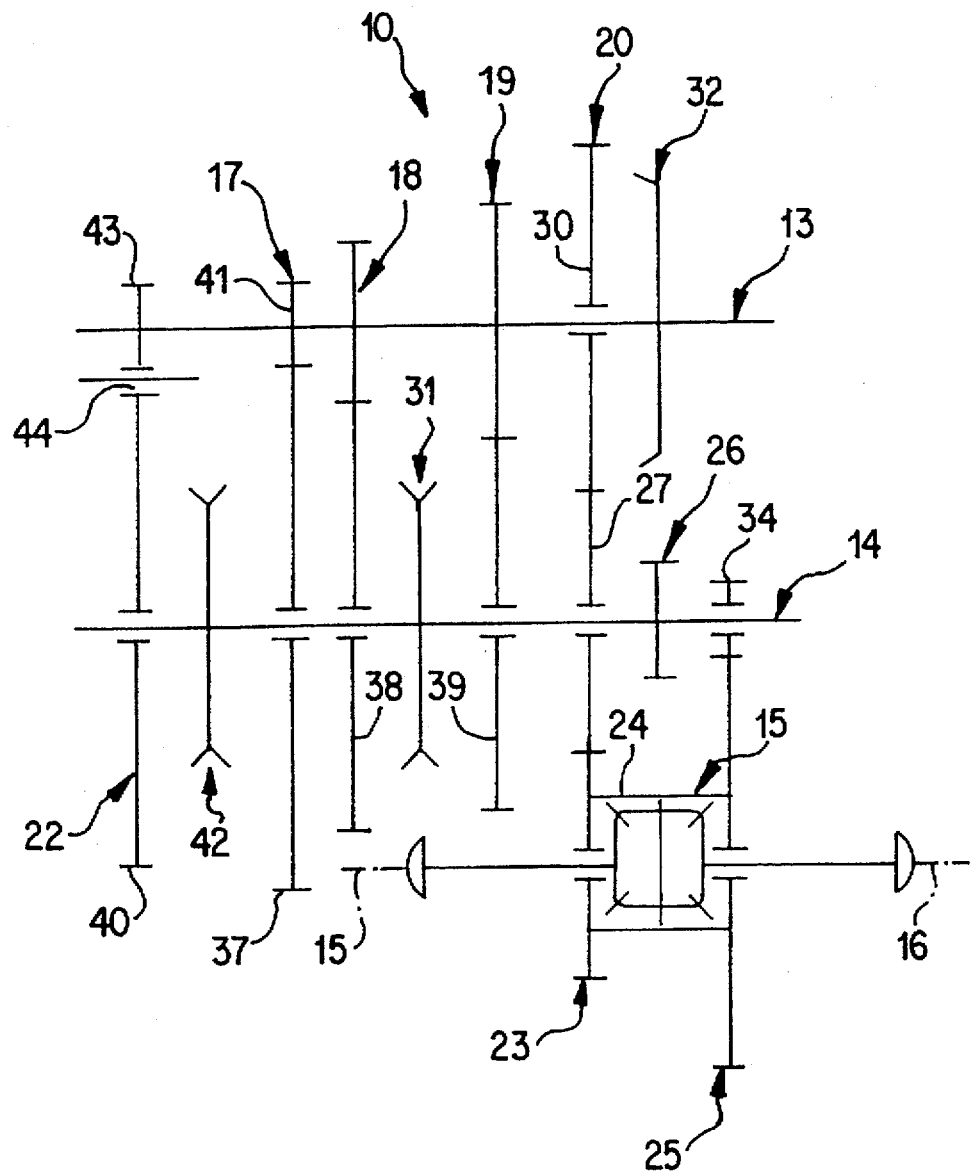
FIG. 4 is a schematic gear diagram of a second embodiment of a change-speed gear unit according to the present invention.

The four embodiments respectively designated by the numerals 9 to 12 in FIGS. 1, 4, 5 and 7 are identical in the following respects.

An input shaft 13, which can be driven by a drive motor, and a parallel output shaft 14 are arranged parallel to the central axis 16—16 of a planetary type differential gear unit 15 of a motor vehicle front axle. The input shaft 13 is connected to the output shaft 14 by a gear stage 17 to form two forward gear ratios and by a gear stage 22 to form a reverse gear ratio.

The gear element 24 used as gear input of the differential gear unit 15, i.e. in the case of a bevel-gear differential the bearing pin mounting the bevel gears rotating about the central axis 16—16, is connected to the output shaft 14 both by an auxiliary gear stage 25 inserted into the torque transmission in the lowest forward gear ratio and by a second auxiliary gear stage 23 so that, by way of an associated change-speed clutch 26, the power flow passes either via the gear stage 23 or via the gear stage 25 to the differential gear unit 15. The gear stage 17 has a gear 41 which is mounted on the input shaft 13 for rotation therewith and which meshes with a loose wheel 37 mounted on the output shaft 14 and is able to be coupled by a gear clutch 42 to the output shaft 14. The gear stage 22 for the reverse gear ratio has a loose wheel 40 which is mounted on the output shaft 14 and meshes with an intermediate gear 44.

With the change-speed gear units 9, 10 and 11, the gear stage 22 for the reverse gear ratio has a gear 43 which is mounted on the input shaft 13 for rotation therewith and which likewise meshes with the intermediate gear 44. In these embodiments the loose wheel 40 can be selectively coupled by the gear clutch 42 to the output shaft 14.

In the change-speed gear units 9 and 10, the input shaft 13 is connected by two additional, neighboring gear stages 18, 19 to the output shaft 14 whose loose wheels 38, 39 are mounted on the output shaft 14 and can be selectively coupled by a gear clutch 31 to the output shaft 14.

In the change-speed gear units 9, 10 and 12, the loose wheels 27, 34 of the second auxiliary gear stage 23 and of the gear stage 25 inserted into the torque transmission in the lowest, first gear ratio are mounted on the output shaft 14, while the respective associated change-speed clutch 26 is a claw clutch.

In the change-speed gear unit 11, the loose wheels 35, 36 of the second auxiliary gear stage 23 and of the auxiliary gear stage 25 inserted into the torque transmission in the lowest, first forward gear ratio are arranged centrally in relation to the central axis 16—16 and are mounted for rotation relative to the gear element 24, used as a gear input, of the differential gear unit 15 and can be selectively coupled to the gear element 24 by the speed-change clutch 26 constructed in the form of a synchronizing clutch comprising a friction clutch and a positive clutch. The gears 27, 34, associated with the output shaft 14, of these two gear stages 23, 25 are then consequently mounted or their shaft for rotation therewith.

The change-speed gear unit 10 has an additional loose wheel 30 which is mounted on the input shaft 13 and which meshes with the gear 27, mounted on the output shaft 14, of the second auxiliary gear stage 23. The loose wheel 30 can be coupled by a gear clutch 32 to the input shaft 13 and thereby form an additional gear stage 20 which can be used either to form an individual, additional forward gear ratio or as a third auxiliary gear stage.

In the change-speed gear unit 11, the input shaft 13 is likewise connected by two additional gear stages 18, 19 to the output shaft 14, whose loose wheels 28, 29 are mounted on the input shaft 13 and can be selectively coupled by a gear clutch 31 to the input shaft 13. The loose wheel 28 of the gear stage 18 meshes with the gear 27, mounted on the output shaft 14 for rotation therewith, of the second auxiliary gear stage 23.

In the change-speed gear unit 12, the gear 41 arranged on the input shaft 13 for rotation therewith is also used as input gear for the gear stage 22 of the reverse gear ratio, and therefore additionally meshes with the intermediate gear 44. The loose wheel 40 meshing with the intermediate gear 44 can be coupled by a gear clutch 45 to the output shaft 14.

In the change-speed gear unit 12, the input shaft 13 is connected by three additional gear stages 18, 19, and 21 to the output shaft 14. In the gear stage 18, the gear 28 arranged on the input shaft 13 is connected to its shaft for rotation therewith. The gear 28 meshes with a loose wheel 38 which is mounted on the output shaft 14 and which can be selectively coupled by the gear clutch 42 to the output shaft 14. The gear stages 19, 21 each have a loose wheel 29, 33 which is mounted on the input shaft 13 and which can be selectively coupled by a gear clutch 31 to the input shaft 13. While the loose wheel 29 of the gear stage 19 meshes with the loose wheel 27 of the auxiliary gear stage 23, the loose wheel 33 of the gear stage 21 is in meshing engagement with the loose wheel 34 of the auxiliary gear stage 25.

As can be seen from the table shown in FIG. 3, in the change-speed gear unit 9 constructed as a six-speed gear unit, the bottom three first to third gear ratios are formed by the gear stages 17 to 19, combined in each case with the auxiliary gear stage 25.

The reverse gear ratio is formed by the gear stage 22 by combination with the auxiliary gear stage 25.

The upper fourth to sixth gear ratios are likewise formed by the gear stages 17 to 19, but in this case by combination with the second auxiliary gear stage 23.

In the six forward gear ratios, the gear stepping is designed geometrically.

As a comparison with the gear ratio table in FIG. 2 shows, the five-speed gear unit is obtained from the six-speed gear unit by not using, in the five-speed gear unit, the gear ratio of the second speed which is used in the six-speed gear unit and which is formed by the gear stage 18 of the main gear unit and by the auxiliary gear stage 25 inserted into the torque transmission in the lowest, first forward gear ratio, so that progressive gear ratio stepping is obtained. The other gear ratios and the gear stages operative in each case can be seen immediately in the tabular representation shown in FIG. 2.

The tables in FIGS. 2 and 3 also apply to the change-speed gear unit 10 shown in FIG. 4.

Figures 5, 6:
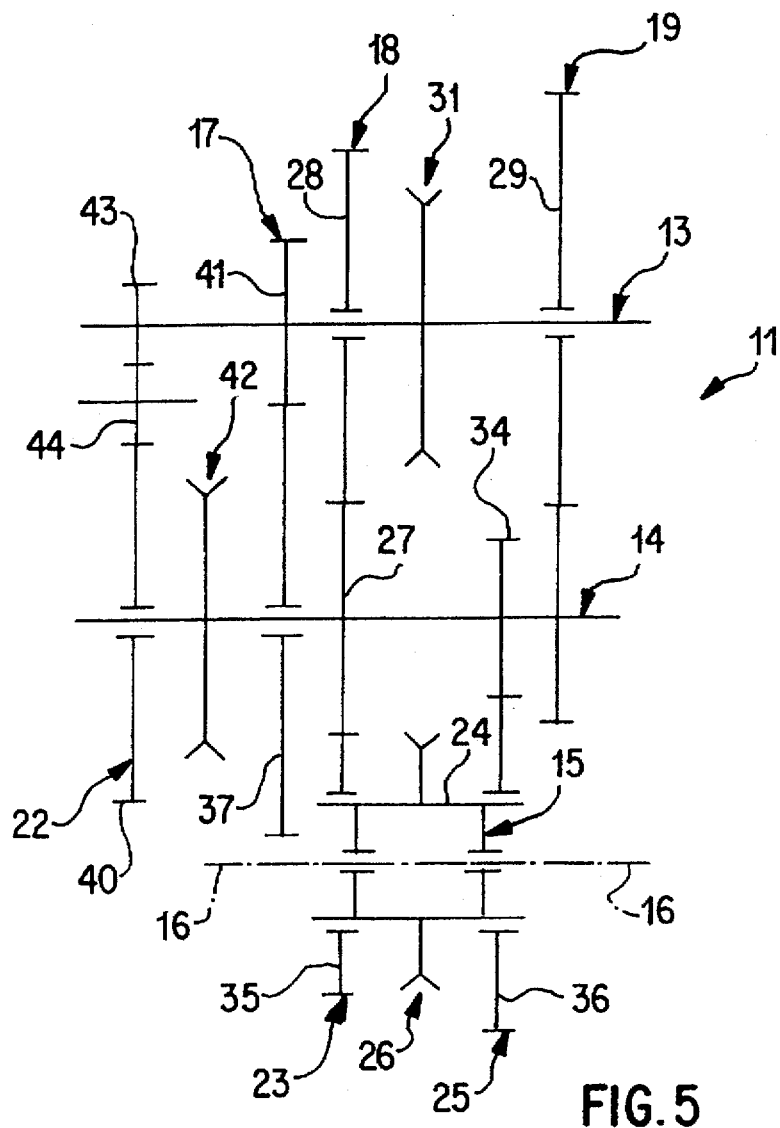
FIG. 5 is a schematic gear diagram of a third embodiment of a change-speed gear unit according to the present invention.
FIG. 6 is a gear ratio table for the shift conditions of the change-speed gear unit of FIG. 5 when the gear unit is operated with six forward gear ratios.

The formation of the gear ratios for the change-speed gear unit 11 shown in FIG. 5, for operation with six forward gear ratios, can be seen in the table shown in FIG. 6. The bottom first to third forward gear ratios are accordingly formed by the gear stages 17 to 19 by combination in each instance with the auxiliary gear stage 25.

The reverse gear ratio is formed by the gear stage 22 by combination with the auxiliary gear stage 25.

The Upper fourth to sixth gear ratios are formed by the gear stages 17 to 19 by combination in each case with the second auxiliary gear stage 23.

In the six-speed gear unit, the gear ratio stepping is likewise geometrical.

Progressive stepping is again achieved in the change-speed gear unit 11 by utilizing only five forward gear ratios, the gear ratio for the second speed of the six-speed gear unit not being used.

Figures 7, 8:
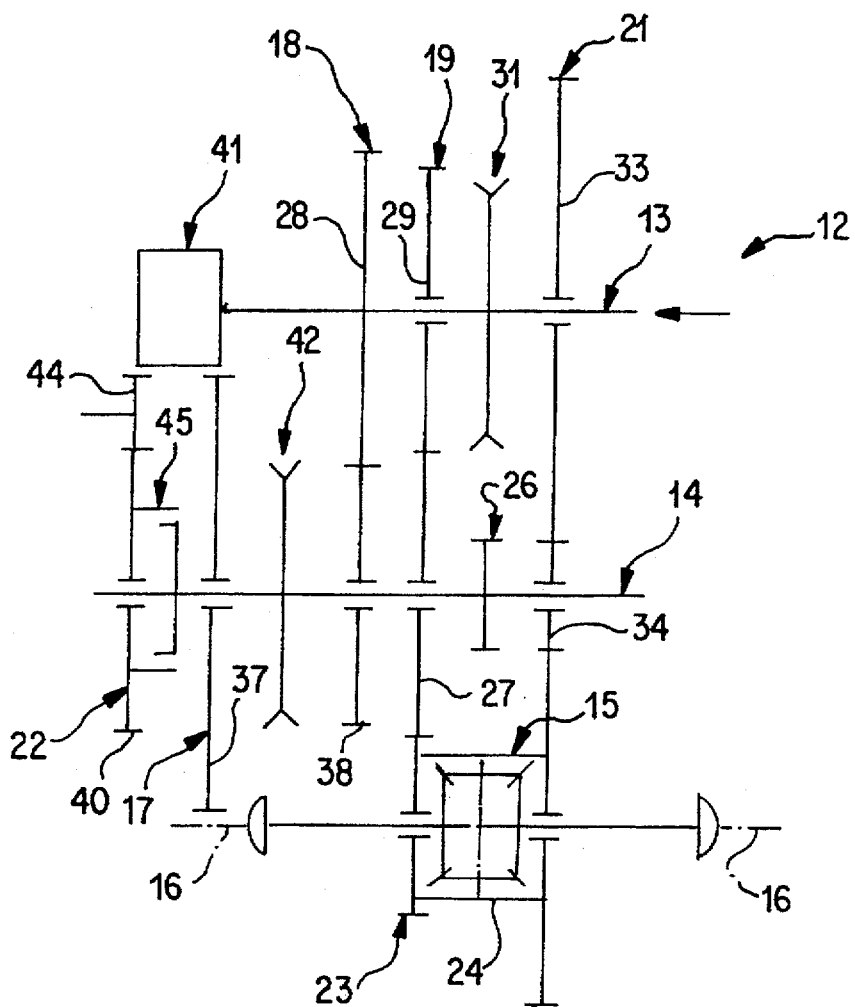
FIG. 7 is a schematic gear diagram of a fourth embodiment of a change-speed gear unit according to the present invention.
FIG. 8 is a gear ratio table for the shift conditions of the change-speed gear unit of FIG. 7 when the gear unit is operated with six forward gear ratios.

The gear ratio formation for the change-speed gear unit 12 for six forward gear ratios and one reverse gear ratio can be seen in FIG. 8. Progressive stepping is provided by making a group change between the second and third gear ratios. Because of the use of the coupled gear stages 19–23 in the fourth gear ratio and 21–25 in the sixth gear ratio, only one clutch is necessary for the shifting of the respective gear ratio.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Gear change unit for a motor vehicle, comprising an input shaft, an output shaft arranged parallel to the input shaft, a three-element differential gear unit of the planetary type having a central axis arranged parallel to the input shaft and to the output shaft, a gear stage configured to form a lowest forward gear used as a driving connection between the input shaft and the output shaft, a gear stage configured to form a highest forward gear used as a driving connection between the input shaft and the output shaft, a gear stage configured to form a reverse gear used as the driving connection between the input shaft and the output shaft, a loose gear arranged concentrically with respect to the output shaft, a first auxiliary gear stage with a high transmission ratio constituting the driving connection between the output shaft and the input-side gear element of the differential gear unit and, in the lowest forward gear, being engaged by an assigned gear change clutch into the torque transmission, a second auxiliary gear stage with a lower transmission ratio constituting the driving connection between the output shaft and the input-side gear element of the differential gear unit and being engaged into the torque transmission, in a higher forward gear by the assigned gear change clutch and the gear stage for forming the lowest forward gear, whereas the second auxiliary gear stage having the lower transmission ratio, with respect to a longitudinal directions of the central axis, is arranged between the gear stage for forming the reverse gear and the auxiliary gear stage having the high ratio; a gear is rotatably disposed on a shaft end of the output shaft opposite to the differential gear unit and has the loose gear of the gear stage for forming the reverse gear which is concentric to the output shaft and is coupleable with the output shaft by a clutch; the gear stage for forming the lowest forward gear, relative to the longitudinal directions of the input shaft, is situated between the gear stage for forming the reverse gear and the gear stage for forming the highest forward gear; an additional gear stage for forming at least one additional forward gear situated between the lowest and the highest forward gear is engageable in the torque transmission between the input shaft and the input-side gear element of the differential gear unit; and a gear of the additional gear stage on the input shaft is arranged one of between the gear stage for forming the lowest forward gear and the gear stage for forming the highest forward gear and on the shaft end of the input shaft opposite the gear stage for forming the reverse gear.

2. The gear change unit according to claim 1, wherein the auxiliary gear stage with the low ratio and the gear stage for forming the highest forward gear or a second additional gear stage which, for forming at least one additional forward gear situated between the lowest and the highest forward gear, is arranged to be engaged for torque transmission between the input shaft and the input-side gear element of the differential gear unit, are operatively associated, via a common loose wheel arranged on the output shaft to form a coupled gear stage having a second loose wheel which is arranged on the input shaft and is arranged to be coupled with the input shaft via a clutch.

3. The gear change unit according to claim 2, wherein the loose wheel, of the coupled gear stage having the gear stage for forming the highest forward gear is separately coupleable with the input shaft via the clutch.

4. The gear change unit according to claim 2, wherein the clutch for coupling the loose wheel of the coupled gear stage having the gear stage for forming the highest forward gear is further operatively connected to the input shaft as the gear change clutch via the loose wheel of the additional gear stage for forming another forward gear situated between the lowest and the highest forward gear.

5. The gear change unit according to claim 1, wherein the auxiliary gear stage with the high ratio and the gear stage for forming the highest forward gear are operatively combined via a common loose wheel arranged on the output shaft to form a coupled gear stage which has a second loose wheel arranged on the input shaft and is coupleable to the input shaft via a clutch.

6. The gear change unit according to claim 2, wherein the loose wheels of the coupled gear stages arranged on the input shaft are operatively connected with the input shaft via a gear change clutch.

7. The gear change unit according to claim 1, wherein the gear change clutch assigned to the auxiliary gear stages is operatively connected with the input-side gear element of the differential gear unit and the loose wheels and of the auxiliary gear stages are associated with the input-side gear element.

8. The gear change unit according to claim 7, wherein a synchronizer clutch with a frictional clutch and a positive-locking clutch is operatively associated with the gear change clutch assigned to the auxiliary gear stages.

9. The gear change unit according to claim 1, wherein a second additional gear stage for forming another forward gear situated between the lowest forward gear and the highest forward gear constitutes the driving connection between the input shaft and the output shaft and, relative to a longitudinal direction of the output shaft, is arranged between the first additional gear stage and the auxiliary gear stage with the low ratio.

10. The gear change unit according to claim 9, wherein the loose wheels of the two additional gear stages are arranged to be coupled with the output shaft via a gear change clutch.

11. The gear change unit according to claim 5, wherein the loose wheels of the coupled gear stages arranged on the input shaft are connected with the input shaft via a gear change clutch.

12. The gear change unit according to claim 11, wherein the gear change clutch assigned to the auxiliary gear stages and is operatively connected with the input-side gear element of the differential gear unit, and the loose wheels of the auxiliary gear stages are associated with the input-side gear element.

* * * * *